United States Patent [19]

Miyamori et al.

[11] Patent Number: 5,684,088
[45] Date of Patent: Nov. 4, 1997

[54] POLYPHENYLENE SULFIDE RESIN COMPOSITIONS AND PROCESS FOR PREPARATION OF SAME

[75] Inventors: Tsuyoshi Miyamori; Yoshihisa Yamamoto; Masami Kato; Masaji Komori; Tetsuo Shimizu, all of Settsu, Japan

[73] Assignee: Daikin Industries, Ltd., Osaka, Japan

[21] Appl. No.: 412,592

[22] Filed: Mar. 29, 1995

Related U.S. Application Data

[63] Continuation of Ser. No. 256,257, filed as PCT/JP93/01585, Nov. 1, 1993, abandoned.

[30] Foreign Application Priority Data

Nov. 5, 1992 [JP] Japan .................. 4-296044

[51] Int. Cl.$^6$ .................... C08G 63/48; C08L 81/00
[52] U.S. Cl. .................... 525/64; 525/189; 525/902
[58] Field of Search ...................... 525/64, 189, 902

[56] References Cited

U.S. PATENT DOCUMENTS

| | | | |
|---|---|---|---|
| 3,487,454 | 12/1969 | Oates et al. | 260/900 |
| 4,056,594 | 11/1977 | Carrow | 264/176 |
| 4,075,158 | 2/1978 | Coale | 260/42.17 |
| 5,159,019 | 10/1992 | Yamamoto et al. | 525/189 |
| 5,324,785 | 6/1994 | Noda et al. | 525/276 |

FOREIGN PATENT DOCUMENTS

| | | |
|---|---|---|
| 0106764 | 4/1984 | European Pat. Off. |
| 106764 | 4/1984 | European Pat. Off. |
| 0124955 | 11/1984 | European Pat. Off. |
| 0460689 | 12/1991 | European Pat. Off. |

OTHER PUBLICATIONS

Supplementary European Search Report of Appln No. EP 93 92 3679 dated Sep. 20, 1994.

*Primary Examiner*—Helen Lee
*Attorney, Agent, or Firm*—Varndell Legal Group

[57] ABSTRACT

The present invention relates to a PPS resin composition comprising a matrix of the PPS which is filled with a PTFE powder baked at a temperature not less than a melting point thereof and having a number-average molecular weight of not less than 1.5 million or PTFE fine particles having an average particle size of 0.05 to 1 μm and comprising a fibrillating core portion of a high molecular weight PTFE with a number-average molecular weight of not less than 1.5 million and a non-fibrillating shell portion of a low molecular weight PTFE so that a content thereof is 40 to 80% by weight in the composition, and also relates to a process for preparing said PPS resin composition, which is characterized in that melting and kneading are carried out at a temperature from a temperature of not less than a melting point of PPS to a temperature of not more lower than a melting point of a high molecular weight PTFE. The polyphenylene sulfide resin composition of the present invention presents sliding properties such as excellent friction and wear resistance which sliding materials mainly containing usual polytetrafluoroethylene have as well as properties of polyphenylene sulfide such as injection moldability and high mechanical properties.

9 Claims, No Drawings

POLYPHENYLENE SULFIDE RESIN COMPOSITIONS AND PROCESS FOR PREPARATION OF SAME

This application is a continuation application of Ser. No. 08/256,257, filed as PCT/93/01585 Nov. 1, 1993, now abandoned.

TECHNICAL FIELD

The present invention relates to a polyphenylene sulfide (hereinafter referred to as PPS) resin composition, particularly relates to a PPS resin composition which is filled with polytetrafluoroethylene (hereinafter referred to as PTFE) at a high rate and is suitable for sliding parts such as bearings, sliding pads and guiding parts for automobiles and industrial machineries.

BACKGROUND ARTS

PPS is a resin having excellent heat resistance, mechanical properties and molding property and it is a big advantage, in view of industrial uses, that injection molding can be applied to PPS resins. Meanwhile PTFE is commercially available in the form of fine particles and powder as materials for molding, and is widely utilized, making the best use of properties such as heat and cold resistance, flame retardance, non-tackiness, stain resistance, chemical resistance, weatherability and electrical properties. PTFE is also used as sliding materials. PTFE is not melt-processable by means of injection molding and the like, and is usually molded by compression molding of which productivity is low.

PPS resin compositions which is filled with PTFE, are commercially available as resin compositions having excellent sliding properties. Such resin compositions usually contain up to 30% by weight of PTFE on the basis of a weight of compositions. Though those compositions have such characteristics as higher mechanical strength, good moldability and injection moldability, they are insufficient, as sliding materials, in sealing property, friction and wear resistance and impact resistance as compared with commercially available sliding materials (for instance, molding powder containing Polyflon TFE fillers of Daikin Industries, Ltd.) having PTFE as a matrix.

JP-A-119040/1975 discloses that unbaked PTFE having a molecular weight of not less than 0.3 million (equal to the melt viscosity of about $6 \times 10^5$ poises as referred to hereinafter) is blended with PPS in an mount of 0.5 to 50% by weight and kneaded. For unbaked PTFE, PTFE powder so-called molding powder is used, and impact strength of the obtained PPS resin compositions is improved because of fibrillation of PTFE powder. According to Examples of that patent application, a PTFE content is 30% by weight even at maximum. If PPS resin compositions are so prepared by the method disclosed in that publication as to contain PTFE at a rate as high as that of the present invention, the injection moldability inherent to PPS is lost due to said fibrillation.

JP-A-232457/1987 discloses that 1 to 80 parts by weight of PTFE is kneaded per 100 parts by weight of PPS at a temperature lower than a melting point of PTFE. However the PTFE used in that patent publication is a fine powder commercially available as a solid lubricant, and usually has a molecular weight of less than one million (equal to about $6 \times 10^6$ poises of melt viscosity), particularly less than 0.3 million (equal to about $6 \times 10^5$ poises of melt viscosity). A PTFE having a molecular weight as high as not less than 1.5 million (the melt viscosity of larger than $10^7$ poises) is not employed. Also the publication discloses no PPS resin composition substantially containing a PTFE at such a high rate as the present invention.

JP-A-175065/1988 discloses resin compositions containing 30 to 85% by weight of straight-chain PPS, 5 to 30% by weight of oxobenzoyl polyester and 10 to 60% by weight of PTFE. A PTFE used in that patent publication is also of a low molecular weight PTFE for lubrication use.

JP-A-213561/1988 discloses that a PTFE pre-baked at a temperature of not less than a melting point thereof is blended with PPS in an amount of 50% by weight. However the PTFE used is of a low molecular weight (number-average molecular weight is assumed to be 0.1 to 0.4 million). Example of that patent publication also discloses the employment of 15% by weight of PTFE, and the specification thereof also discloses that when the PTFE is more than 50% by weight, it will not bring any advantages.

JP-A-212442/1991 discloses that the strength of the obtained PPS resin compositions is increased by blending, with the PPS, 3 to 40% by weight of a high molecular weight PTFE powder commercially available as a molding powder or fine powder and 5 to 40% by weight of a low molecular weight PTFE powder and by fibrillation of a high molecular weight PTFE. However a PTFE content in Example of that patent publication is 35% by weight even at maximum.

JP-A-154842/1992 discloses that a high molecular weight PTFE is melted and blended with PPS, but a content thereof is low, that is, 20% by weight.

As mentioned hereinabove, the prior arts are such that a low molecular weight PTFE is merely added to PPS resin compositions as a lubricant and a high molecular weight PTFE being added as a reinforcement. Addition of a high molecular weight PTFE into PPS at a high content has not yet been achieved, and PPS resin compositions having enough sliding properties, as compared with sliding materials mainly containing a usual PTFE, has not been obtained until now. When a high molecular weight PTFE is blended with PPS at a high rate, flowability of resin compositions is generally lost due to fibrillation or aggregation of the PTFE. Contrarily when a low molecular weight PTFE is blended at a high rate, the resulting resin compositions show a certain flowability, but may provide a composition having a non-uniform dispersion due to aggregation and may provide a composition having inferior mechanical properties.

The present invention has been made to solve the problems as mentioned above, and the purpose of the invention is to provide PPS resin composition having properties of PPS such as injection moldability, excellent mechanical properties and heat resistance together with good friction and wear resistance, sealing property, chemical resistance and impact resistance which are possessed by sliding materials mainly containing a usual PTFE and to provide a process for preparing such resin compositions.

DISCLOSURE OF THE INVENTION

The present invention relates to PPS resin compositions, in which a matrix of PPS is filled with a PTFE powder pre-baked at a temperature of not less than a melting point thereof and having a number-average molecular weight of not less than 1.5 million and an average particle size of 2 to 800 μm or PTFE fine particles having an average particle size of 0.05 to 1 μm, which comprise a fibrillating core portion of a high molecular weight PTFE having a number-average molecular weight of not less than 1.5 million and a non-fibrillating shell portion of a low molecular weight PTFE, so that a PTFE content in the resin compositions is 40 to 80% by weight.

PREFERRED EMBODIMENTS FOR THE INVENTION

The PPS used in the present invention is a resin mechanical thermoplastic having excellent properties, heat resistance and moldability, and there may be used non-crosslinked or partly crosslinked PPS and a mixture thereof or a modified resin thereof. There is no limitation on the molecular weight of the PPS. A melting point of the resin is preferably 270° to 300° C. Examples of preferable PPS are, for instance, "Ryton P-4" of Phillips, "W-214" of Kureha Chemical Industry Co., Ltd., "T-4" of Kabushiki Kaisha Tohpren, or the like.

The PTFE used in the present invention is a resin having an excellent heat and cold resistance, flame retardance, non-tackiness, stain resistance, chemical resistance, weatherability, electrical properties, and the like, and is a high molecular weight PTFE having a number-average molecular weight of not less than 1.5 million (melt viscosity at 380° C. is usually higher than $10^7$ poises). When a number-average molecular weight is less than 1.5 million, though the sliding properties can be given to PPS resin compositions, but the mechanical properties of molded articles such as strength and elongation tend to be insufficient. A molecular weight is preferably not less than three million in number-average molecular weight (the melt viscosity of not less than $10^8$ poises), more preferably $10^{10}$ to about $10^{13}$ poises of a melt viscosity (number-average molecular weight is assumed to be tens of millions). The melting point of the PTFE used in the present invention is preferably 327° to 345° C. Examples of such PTFE are, for instance, a pre-baked PTFE powder having an average particle size of 2 to 800 µm, preferably 5 to 500 µm, more preferably 10 to 300 µm, or composite PTFE fine particles comprising a fibrillating core portion of a high molecular weight PTFE and a non-fibrillating shell portion of a low molecular weight PTFE.

The PPS resin compositions of the present invention are filled with such PTFE in an amount of 40 to 80% by weight on the basis of the PPS weight. When a PTFE content is less than 40% by weight, a limiting PV and sealing property of the PPS resin compositions deteriorate, and when more than 80% by weight, the PPS resin compositions become difficult to be molded and the strength of molded articles lowers. Preferable PTFE content is 45 to 70% by weight.

The PPS resin compositions of the present invention may contain fillers, other polymer components, or the like in addition to the PPS and the PTFE.

The fillers are blended to enhance wear resistance and mechanical properties, and there can be used various organic or inorganic fillers in the form of fiber or particle. A content of the fillers is usually 5 to 40% by weight on the basis of weight of the compositions. Examples of fibrous fillers are, for instance, glass fibers, carbon fibers, aromatic polyamide resins, aromatic polyester resins, and the like, and examples of the particle fillers are, for instance, graphites, molybdenum disulfide, metal powders, and the like.

The polymer components are blended to further enhance an impact resistance. A content thereof is 1 to 20% by weight. Examples of the polymers are, for instance, so-called engineering plastics such as polyketones, polyether sulfone, polysulfone and liquid crystal polymer, fluorine resins such as copolymers of ethylene and tetrafluoroethylene and vinylidene fluoride polymers and elastomers.

The PPS resin compositions wherein a matrix of the PPS is filled with the PTFE powder of an average particle size of 2 to 800 µm comprising a high molecular weight PTFE having a number-average molecular weight of not less than 1.5 million or the PTFE fine particles having an average particle size of 0.05 to 1 µm comprising a fibrillating core portion of a high molecular weight PTFE having a number-average molecular weight of not less than 1.5 million and a non-fibrillating shell portion of a low molecular weight PTFE so that the content thereof is 40 to 80% by weight, can be prepared by melting and kneading the PTFE powder or the PTFE fine particles and the PPS at a temperature of from a temperature of not less than the melting point of PPS to a temperature of not more than the melting point of high molecular weight PTFE.

A melting point of PPS is usually 270° to 300° C., and that of PTFE is usually 327° to 345° C. The kneading temperature of the both is around the middle of those melting points, that is to say, preferably 310°±15° C., more preferably 310°±10° C. Melting and kneading under such temperature conditions make it possible to blend a PTFE at a high rate without excessive fibrillation thereof. If the PTFE is kneaded at a temperature not less than the melting point thereof, a PTFE powder aggregates and a melt viscosity of the resulting PPS resin compositions remarkably increases, thus injection moldability being lost. Conventionally, for instance, inorganic fibers have been kneaded in PPS at a wide temperature range of about 280° to 350° C.

The PPS resin compositions of the present invention are prepared by melting and kneading PPS and PTFE in the form of powder at a temperature of from a temperature of not less than the melting point of the PPS to a temperature of not more than the melting point of the PTFE, wherein the PTFE is pre-baked preferably at about the melting point or higher and pulverized into powder before the melting and kneading. A PTFE in the form of powder is easily dispersed in the PPS because fibrillation thereof is inhibited by pre-baking. An average particle size of a PTFE powder may be in a wide range of from 2 to 800 µm, preferably 5 to 500 µm, more preferably 10 to 300 µm in view of appearance of molded articles.

As described hereinbefore, the PPS resin compositions of the present invention are prepared by melting and kneading at a temperature of from a temperature of not less than the melting point of the PPS to a temperature of not more than the melting point of the PTFE. Meanwhile when melting and kneading the PPS and the PTFE fine particles having an average particle size of 0.05 to 1 µm and comprising a fibrillating core portion of a high molecular weight PTFE having a number-average molecular weight of not less than 1.5 million and a non-fibrillating shell portion of a low molecular weight PTFE, the melting point of the high molecular weight PTFE is assumed to be a maximum peak temperature on the chart which is obtained by measuring melting characteristics of the PTFE fine particles with DSC. Such PTFE in the form of fine particles are colloidal PTFE fine particles having an average particle size of 0.05 to 1 µm, which comprise a fibrillating core portion of a high molecular weight PTFE and a non-fibrillating shell portion of a low molecular weight PTFE. It is preferable to use such PTFE in the form of an aggregated powder having an average particle size of 100 to 1000 µm obtainable by aggregation, coagulation and drying of aqueous dispersion, in the manner as described, for instance, in JP-A-154842/1992. A weight ratio of the core portion to the shell portion is preferably 90:10 to 50:50. A number-average molecular weight of the high molecular weight PTFE of the core portion is not less than 1.5 million, preferably 3 million to tens of millions. A number-average molecular weight of the low molecular weight PTFE of the shell portion is thousands to one million.

It is preferable that the average molecular weight of the fine particles calculated by arithmetical mean of the respective number-average molecular weights in consideration of the weight ratio of the core portion to the shell portion, is not less than 1.5 million. It is also preferable to heat-treat the fine particles at a temperature of not less than the melting point of the high molecular weight PTFE, to pulverize to a powder having a particle size of 5 to 300 μm and then to melt and knead the powder with the PPS.

When the PTFE fine particles having such a core-shell structure are melted and kneaded, the resulting resin compositions can assure a uniform dispersion of the PTFE therein and the appearance thereof is also excellent as compared with one which is prepared by melting and kneading a heat-treated PTFE powder.

In the present invention, melting points of the PTFE and the PPS are assumed to be a peak temperature on a heat absorption curve obtainable by heating up from a room temperature at a rate of 10° C./minute with the use of a 1090 differential scanning calorimeter (DSC) of E.I. du Pont. When the curve shows a double peak, the peak temperature is assumed to be the one at the side of high temperature.

In the present invention, it can be judged by measuring a melt viscosity of the PTFE whether or not a number-average molecular weight of the PTFE is not less than 1.5 million. The melt viscosity of the PTFE is first measured by the method (A) shown hereinbelow. When measurable by the method (A) (in case the PTFE flows out), the measured value is assumed to be the melt viscosity. When impossible to measure by the method (A), in other words, in case the PTFE does not flow out, the method (B) is used, and the measured value can be assumed to be the melt viscosity. As described hereinabove, when the number-average molecular weight is 1.5 million, the melt viscosity is $10^7$ poises. Therefore when the measured melt viscosity is more than $10^7$ poises, it can be seen that the number-average molecular weight is not less than 1.5 million.

Method (A)

By the use of a Kouka type flow tester of Shimazu Corporation, a cylinder of 11.3 mm inner diameter is filled with a polymer powder, and after being kept at 380° C. for 5 minutes, a load (7 or 32 kg) is applied to a piston, then the polymer is extruded through an orifice of 0.21 cm inner diameter (2R) and 0.8 cm long (L), and the flow rate (Q: cm²/second) of the polymer is measured. A melt viscosity is obtained by the following formula:

$$\text{Melt viscosity (poise)} = \frac{\Delta P \cdot 2R \cdot \pi \cdot R^a}{16 \cdot L \cdot Q}$$

$\Delta P$: Load (dyne)

When a number-average molecular weight is 1.5 million, the value measured by the above method is about $10^7$ poises.

Method (B)

Creep test is carried out in the following manner by the use of a "Thermoflex sample low located TMA" (available from Rigaku Denki Kabushiki Kaisha) to measure a melt viscosity.

First, a sample is prepared by the following method. A cylindrically shaped metal mold of 50 mm inner diameter is filled with 80 g of a PTFE powder or fine particles with paper pieces being put on top and bottom thereof, then a pressure is applied gradually for about 30 seconds up to a final pressure of about 352 kg/cm², and after that, the pressure is kept for two minutes. Subsequently a molded article is taken out from the metal mold, and is baked for 90 minutes in an electric oven with air heated up to 371° C.

Then the oven is cooled down to 250° C. at a rate of 1° C./minute. After being kept for 30 minutes at that temperature, a baked article is taken out from the oven. This baked article of cylindrical shape is cut along the side thereof to obtain 0.5 mm thick sheet of strip shape.

The sheet is then cut to make a small piece of 4 to 5 mm wide, 15 mm long, and the width and thickness thereof are accurately measured to calculate the sectional area. Then metal fittings for mounting the sample are set at both ends of the sample so that the distance between those metal fittings is 1.0 cm. This metal fittings-sample assembly is put in a cylindrical shape oven. The oven is heated up from a room temperature up to 380° C. at a rate of 20° C./minute and is kept at the temperature. After about five minutes keeping, about 15 kg of a load is applied to the assembly. From an elongation-time curve, an elongation during the time from 60 to 120 minutes after the load has been applied is read to calculate a rate of the elongation to the time (60 minutes). Then a melt viscosity is calculated by the following formula:

$$\eta = \frac{W \times Lr \times g}{3 \times (dLr/dT) \times Ar}$$

wherein;

η=Melt viscosity (poise)

W=Tensile load (g)

Lr=Length of sample (cm) (380° C.)

g=Constant of gravity 980 cm/second² dLr/dT=Rate of elongation to time from 60 to 120 minutes (cm/second)

Ar=Sectional area of sample (cm²) (380° C.)

Lr/Ar can be calculated by the following formula with the use of a measurement of a thermal expansion separately obtained:

Lr/Ar=0.80×L (Length at room temperature) +A (Sectional area at room temperature)

In the present invention, an average particle size of a large size PTFE powder is measured with 50 g of powder in accordance with JIS (Japanese Industrial Standards) K 689 1-5.4, and those of a small size PTFE powder and PTFE fine particle are measured by the use of a CAPA 500 of Horiba, Ltd. through spontaneous precipitation method with the powder being dispersed in a 2% by weight aqueous $C_7 F_{15}$ COONH$_4$ solution by ultrasound.

The PTFE used in the present invention may contain a PTFE modified by copolymerization with the use of less than 1% by weight of modifying comonomers. The effect of the present invention is not impaired by the modification. As the modifying comonomers, there are used hexafluoropropylene, perfluoroalkyl vinylether, perfluoroalkyl (number of carbons 1 to 10) ethylene, perfluoroalkyl (number of carbons 1 to 10) allylether, and a compound represented by the following formula:

wherein,

X is fluorine or trifluoromethyl group,

Y is halogen, m is 0 or 1, provided that when m is 1,

X is limited to fluorine, n is 0 to 5, p is 0 to 2.

The PPS resin compositions of the present invention are concretely obtained by the known blending method, for example, by blending the PPS, the PTFE and other components by a mixer such as a V shaped blender, a tumbler mixer or a henshel mixer and further by kneading with a melting and kneading machine such as a twin screw extruder. The resulting PPS resin compositions are in the form of pellets. The PTFE and other components may be blended with the PPS under melting in the melting and kneading machine.

The PPS resin compositions thus obtained, for instance, in the form of the pellets can be molded to the desired forms, for instance, sheet, pipe and strip by the use of molding machines for general thermoplastic resins, for instance, an injection molding machine, a compression molding machine, an extrusion molding machine, and the like. Melt-processability of the resin compositions is judged by a value of a melt-flow-rate (MFR). For melt-processing the resin compositions, the MFR thereof must be not less than 0.01, and for injection molding, the MFR of the resin compositions must be not less than 0.03. When the MFR is 0.03, a melt viscosity is around $10^7$. The measurement of MFR in the present invention was carried out at a test pressure of 5 kgf/cm$^2$, an orifice diameter of 2.1 mm and an orifice length of 8 mm by the use of a melt indexer (available from Kabushiki Kaisha Toyo Seiki Seisakusho).

Since the PTFE is blended at a high rate, the PPS resin compositions of the present invention as obtained by the above process are fully endowed with heat and cold resistance, flame retardance, non-tackiness, stain resistance, chemical resistance, weatherability, electrical properties, and the like, which are inherent to PTFE, together with mechanical properties, heat resistance, and moldability, particularly injection moldability which PPS has.

The present invention is explained by means of the following Examples. It is to be understood that the present invention is not limited to the scope.

EXAMPLES 1 AND 2

A PPS (T-4: made by Kabushiki Kaisha Tohpren, melting point of 280° C.) and a PTFE powder which was once heat-treated at a temperature of not less than the melting point (Polyflon M-12 of Daikin Industries, Ltd. was heat-treated at 380° C. and pulverized to a powder of an average particle size of 150 μm; melting point of 329° C., melt viscosity of about $2\times10^{11}$ poises(Method (B)) were uniformly blended by a henshel mixer in the blending amount shown in Table 1, and 80 g of the obtained powder was melted and kneaded for 10 minutes at 300° C. (Example 1) and at 320° C. (Example 2) by the use of a Brabender mixer. A MFR of the resulting compositions was measured at 300° C., 320° C. and 340° C. respectively. The results are shown in Table 1.

EXAMPLE 3

A stainless steel (SUS 316) autoclave, which has a capacity of 6 liters and is provided with anchor type stainless steel agitation blades and a jacket for temperature control, was charged with 2960 ml of deionized water and 1.0 g of ammonium perfluorooctanoate, and while heating the autoclave up to 55° C., oxygen in the system was substituted with a nitrogen gas three times and with a TFE gas twice. Then an inner pressure was increased to 8 kgf/cm$^2$ with TFE, and an agitation speed was kept at 250 rpm, and at an inner temperature of 55° C.

Subsequently 0.4 g of hexafluoropropene (HFP) and then an aqueous solution prepared by dissolving 34 mg (23 ppm per total water volume) of ammonium persulfate (ASP) into 20 ml of water, were forced into the autoclave with TFE to increase the inner pressure to 9 kgf/cm$^2$. A reaction temperature and agitation speed were kept at 55° C. and 250 rpm, respectively. TFE was continuously supplied to the autoclave to keep the inner pressure at 9±0.5 kgf/cm$^2$.

When, after addition of an initiator, a TFE consumption by the reaction had reached 480 g, a supply of TFE and the agitation were stopped and TFE was discharged from the autoclave. Then the inner pressure of the autoclave being raised to 9 kgf/cm$^2$ with TFE, an aqueous solution prepared by dissolving 700 mg (233 ppm per total water volume) of ASP into 20 ml of water and also 20 g of 1,2-dichloroethane were forced into the autoclave. Subsequently the reaction was re-started by the agitation, and TFE was continuously supplied into the autoclave so as to keep the inner pressure at 9±0.5 kgf/cm$^2$.

At the time when 600 g in total of a TFE monomer had been consumed for the reaction, the agitation and a monomer supply were stopped, and immediately the gases in the autoclave were discharged until a normal pressure was obtained, then the reaction was complete. Total reaction time was 17 hours, and a weight ratio of the core portion to the shell portion was 80:20. Then ammonium carbonate was added into the obtained latex, and after agitation, coagulation and rinsing, the latex was agitated at 140° C. for 15 hours, and thereby an aggregated powder having an average particle size of 500 μm was obtained. The reactions were conducted 8 batches in total. The average particle size of fine particles comprising the powder was 0.20 to 0.21 μm. A melt viscosity of the core portion was about 1.8 to about $2.0\times10^{11}$ poises, and that of the shell portion being about 2000 to about 3000 poises. When the powder was measured by the use of the DSC, a heat absorption curve showed a double peak, and the peak at the higher temperature side was 338° C.

The average molecular weight of the powder is large enough to belong to the high molecular weight PTFE. The corresponding melt viscosity is usually not less than about $10^8$ poises, but the powder has an apparently low melt viscosity because of a core-shell structure.

By the use of the powder, the heading was carried out with the blending mount shown in Table 1, and a MFR was measured. The results are shown in Table 1.

EXAMPLE 4

The PTFE powder used in Example 3 was further heat-treated (baked) at 350° C. for one hour, and was pulverized to a particle size of 35 μm. A MFR was measured after melting and kneading in the same manner as Example 1 except for the use of the PTFE powder obtained above and the PPS used in Example 1 at a weight ratio of 70:30. The results are shown in Table 1.

Comparative Example 1

The melting and kneading procedures were carried out in the same manner as in Example 1 except for a kneading temperature of 340° C., and then a MFR was measured. The results are shown in Table 1.

Comparative Example 2

The melting and kneading procedures were carried out in the same manner as in Example 1 except that Polyflon M-12 (melting point of 341° C., melt viscosity of about $2\times10^{11}$ poises (by the Method (B)), non-baked, without a core-shell structure) of Daikin Industries, Ltd. was used as a PTFE and a weight ratio of the PPS and the PTFE was 70:30, and then a MFR was measured. The results are shown in Table 1.

EXAMPLE 5

40% By weight of the PPS used in Example 1, 50% by weight of the PTFE used in Example 1 and 10% by weight of a carbon fiber (M-201S of Kureha Chemical Industry Co., Ltd.) were uniformly blended by a henshel mixer. The blended powder obtained was melted and kneaded at 280° to 300° C. by a twin screw extruder (Laboplastomill of Kabushiki Kaisha Toyo Seiki Seisakusho) to be pelletized. An extruding speed was 1.5 kg/hour. A MFR measured at 300° C. of the obtained resin composition in the form of pellet was 0.03.

The pellets were supplied to an injection molding machine (SG50 of Sumitomo Heavy Industries Ltd.), and various sample pieces were prepared at a cylinder temperature of 270° to 320° C. and a mold temperature of 140° C. With the use of the obtained sample pieces, Rockwell hardness, tensile strength, elongation, tensile modulus, bending strength, bending modulus, wear factor and friction coefficient of the pelletized resin compositions were measured. The results are shown in Table 2.

Rockwell hardness was measured by means of a R scale in accordance with ASTM D785 by the use of a Rockwell hardness tester of Yasuda Seiki Seisakusho., Ltd.

Tensile strength, elongation and tensile modulus were measured at room temperature in accordance with ASTM D638 by the use of universal testing instruments of Orientec Corporation, provided that a tension was applied at a rate of 10 mm/minute.

Bending strength and bending modulus were measured at room temperature in accordance with JIS K6911 by the use of the universal testing instruments of Orientec Corporation, provided that a bending speed was 2 mm/minute.

Wear factor and friction coefficient were measured by the use of a friction and wear tester of Suzuki-Matsubara type (thrust type) of Orientec Corporation under the following conditions:

Load: 10 kgf/cm$^2$
Speed: 60 m/minute
Distance: 10 km
Atmosphere: Dry
Counter member: Stainless Steel (S45C)

EXAMPLE 6

In the same manner as in Example 5, the melting and heading procedures were carried out except that the PTFE powder of Example 4 was used as PTFE and the blending amount shown in Table 2 was employed, and the same properties as those in Example 5 were measured. The results are shown in Table 2. A MFR measured at 300° C. of the obtained resin composition was 1.0.

Comparative Example 3

The melting and kneading procedures were carried out in the same manner as in Example 5 except that as a PTFE, Lubron L-SF (melting point of 327° C., melt viscosity of $2 \times 10^5$—by Method (A)) of Daikin Industries, Ltd. was used, and the same properties as those in Example 5 were measured. The results are shown in Table 2. A MFR measured at 300° C. of the obtained resin composition was 3.3.

Comparative Example 4

The melting and kneading procedures were carried out in the same manner as in Example 5, except that the PTFE powder of Example 1 was used as a PTFE and a weight ratio of PPS, PTFE and carbon fiber was 60:20:20, and the same properties as those in Example 5 were measured. The results are shown in Table 2. A MFR measured at 300° C. of the obtained resin composition was 18.

TABLE 1

|  | Example 1 | Example 2 | Example 3 | Example 4 | Comparative Example 1 | Comparative Example 2 |
|---|---|---|---|---|---|---|
| PPS (% by weight) | 50 | 50 | 40 | 30 | 50 | 70 |
| PTFE (% by weight) | 50 | 50 | 60 | 70 | 50 | 30 |
| Kneading temp. (°C.) | 300 | 320 | 300 | 300 | 340 | 300 |
| Measuring temp. (°C.) | Melt flow rate (g/10 minutes) | | | | | |
| 300 | 0.12 | 0.13 | 2.5 | 0.15 | <0.01 | <0.01 |
| 320 | 0.07 | 0.08 | 3.2 | 0.09 | <0.01 | <0.01 |
| 340 | <0.01 | <0.01 | 1.2 | 0.02 | <0.01 | <0.01 |

TABLE 2

|  | Unit | Example 5 | Example 6 | Comparative Example 3 | Comparative Example 4 |
|---|---|---|---|---|---|
| PPS | % by weight | 40 | 30 | 40 | 60 |
| PTFE | % by weight | 50 | 60 | 50 | 20 |
| Carbon fiber | % by weight | 10 | 10 | 10 | 20 |
| MFR | (g/10 minutes) | 0.03 | 1.0 | 3.3 | 18 |
| Rockwell hardness | H$_R$R | 69 | 69 | 69 | 90 |
| Tensile strength | kgf/cm$^2$ | 530 | 470 | 400 | 1200 |
| Elongation | % | 3.6 | 2.2 | 1.8 | 3.2 |
| Tensile modulus | kgf/cm$^2$ | 25400 | 27600 | 25400 | 42000 |
| Bending strength | kgf/cm$^2$ | 780 | 660 | 580 | 1600 |
| Bending modulus | kgf/cm$^2$ | 25500 | 35700 | 35600 | 9400 |

TABLE 2-continued

|  | Unit | Example 5 | Example 6 | Comparative Example 3 | Comparative Example 4 |
|---|---|---|---|---|---|
| Wear factor | | | | | |
| Sample | mm³/kg*km | 0.02 | 0.02 | 0.01 | Critical PV (Note 1) |
| Counter member | mm³/kg*km | 0 | 0 | 0 | Critical PV |
| Friction coefficient | — | 0.14–0.25 | 0.06–0.19 | 0.15–0.26 | |

(Note 1) Critical PV means the state in which wear factor and friction coefficient cannot be measured due to rapid progress of friction.

As is clear from Table 1, it can be seen that when melting and kneading are carried out at a temperature of from a temperature of not less than a melting point of the PPS to a temperature of not more than a melting point of the PTFE, the resin compositions having flowability (excellent in moldability) even at a high content of the PTFE can be obtained. It can also be found that flowability of the resin composition is higher at a temperature lower than a melting point of the PTFE.

Also as is clear from Table 2, it can be seen that when the high molecular weight PTFE is used, the mechanical strength is increased and excellent friction and wear resistance can be obtained by blending the PTFE at a high rate, as compared with the case where a low molecular weight PTFE is used. Therefore the PPS resin compositions of the present invention are suitable for various sealing materials, bearings, and the like.

The present invention presents PPS resin compositions having excellent sliding properties such as friction and wear resistance together with injection moldability, excellent mechanical properties, heat resistance, sealing properties, chemical resistance, and impact strength.

INDUSTRIAL APPLICABILITY

The resin compositions of the present invention, which are obtained in the manner as explained hereinbefore, are endowed with enough heat and cold resistance, flame retardance, non-tackiness, stain resistance, chemical resistance, weatherability, electric properties, and the like which a PTFE has, together with mechanical properties, heat resistance and moldability, particularly injection moldability which a PPS has, because the resin composition is filled with PTFE at a high rate. For instance, the PPS resin compositions obtained in the form of pellet can be molded to the desired form, for example, sheet, pipe and strip by molding machine for general thermoplastic resins, for instance, an injection molding machine, a compression molding machine, an extrusion molding machine, and the like.

We claim:

1. A polyphenylene sulfide resin composition which comprises a matrix of polyphenylene sulfide which is fled with high molecular weight polytetrafluoroethylene filler selected from the group consisting of a polytetrafluoroethylene powder (1) and composite polytetrafluoroethylene fine particles (2), a content of said high molecular weight polytetrafluoroethylene filler is 40 to 80% by weight of the composition, said polytetrafluoroethylene powder (1) is a polytetrafluoroethylene powder baked at a temperature of not less than the melting point of said polytetrafluoroethylene powder and has a number-average molecular weight of not less than 1.5 million and an average particle size of 2 to 800 µm, and said composite polytetrafluoroethylene fine particles (2) have an average particle size of 0.05 to 1 µm and a core portion of a high molecular weight polytetrafluoroethylene with a number-average molecular weight of not less than 1.5 million which can be fibrillated and a shell portion of a low molecular weight polytetrafluoroethylene with a number-average molecular weight of thousands to one million which cannot be fibrillated.

2. The polyphenylene sulfide resin composition of claim 1, wherein said high molecular weight polytetrafluoroethylene is said polytetrafluoroethylene filler powder (1).

3. The polyphenylene sulfide resin composition of claim 2, wherein said content of said high molecular weight polytetrafluoroethylene filler is 50 to 80% by weight of said composition.

4. A process for preparing a polyphenylene sulfide resin composition, comprising a matrix of polyphenylene sulfide which is filled with high molecular weight polytetrafluoroethylene filler selected from the group consisting of a polytetrafluoroethylene powder (1) and composite polytetrafluoroethylene filler fine particles (2), a content of said high molecular weight polytetrafluoroethylene is 40 to 80% by weight of the composition; said polytetrafluoroethylene powder (1) is a polytetrafluoroethylene baked at a temperature not less than the melting point of said polytetrafluoroethylene powder (1) and has a number-average molecular weight of not less than 1.5 million and an average particle size of 2 to 800 µm, said composite polytetrafluoroethylene fine particles (2) have an average particle size of 0.05 to 1 µm and a core portion of a high molecular weight polytetrafluoroethylene with a number-average molecular weight of not less than 1.5 million which can be fibrillated and a shell portion of a low molecular weight polytetrafluoroethylene with a number-average molecular weight of thousands to one million which cannot be fibrillated; said process including melting and kneading said high molecular weight polytetrafluoroethylene filler and said polyphenylene sulfide at a temperature from a temperature of not less than the melting point of said polyphenylene sulfide to a temperature of not more than the melting point of the high molecular weight polytetrafluoroethylene filler.

5. The process for preparing a polyphenylene sulfide resin composition according to claim 4, wherein said high molecular weight polytetrafluoroethylene filler is said polytetrafluoroethylene powder (1).

6. The process for preparing a polyphenylene sulfide resin composition according to claim 4, wherein said content of said polytetrafluoroethylene filler is 50 to 80% by weight of said composition.

7. A polyphenylene sulfide resin composition which comprises a matrix of polyphenylene sulfide which is filed with high molecular weight polytetrafluoroethylene selected from the group consisting of a polytetrafluoroethylene filler powder (1) and composite polytetrafluoroethylene fine particles (2), a content of said high molecular weight polytetrafluoroethylene is 40 to 80% by weight of the composition, said polytetrafluoroethylene powder (1) is a polytetrafluoroethylene powder baked at a temperature of not less than the melting point of said polytetrafluoroethylene powder and has a number-average molecular weight of not less than 1.5 million and an average particle size of 2 to 800 μm, and said composite polytetrafluoroethylene fine particles (2) have an average particle size of 0.05 to 1 μm and a core portion of a high molecular weight polytetrafluoroethylene with a number-average molecular weight of not less than 1.5 million which can be fibrillated and a shell portion of a low molecular weight polytetrafluoroethylene with a number-average molecular weight of thousands to one million which cannot be fibrillated, said composition is prepared by melting and kneading said high molecular weight polytetrafluoroethylene filler and said polyphenylene sulfide at a temperature from a temperature of not less than the melting point of said polyphenylene sulfide to a temperature of not more than the melting point of the high molecular weight polytetrafluoroethylene filler.

8. The polyphenylene sulfide resin composition of claim 7, wherein said high molecular weight polytetrafluoroethylene is said polytetrafluoroethylene filler powder (1).

9. The polyphenylene sulfide resin composition of claim 7, wherein said content of said high molecular weight polytetrafluoroethylene filler is 50 to 80% by weight of said composition.

* * * * *